(12) United States Patent
Eigel et al.

(10) Patent No.: US 11,697,430 B2
(45) Date of Patent: Jul. 11, 2023

(54) METHOD FOR PROVIDING A ROUTE STIPULATION

(71) Applicant: Volkswagen Aktiengesellschaft, Wolfsburg (DE)

(72) Inventors: Thomas Eigel, Berlin (DE); Timur Aminev, Braunschweig (DE); Stefan Detering, Braunschweig (DE); Jens Hoedt, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 256 days.

(21) Appl. No.: 17/270,011

(22) PCT Filed: Sep. 20, 2019

(86) PCT No.: PCT/EP2019/075294
§ 371 (c)(1),
(2) Date: Feb. 20, 2021

(87) PCT Pub. No.: WO2020/058463
PCT Pub. Date: Mar. 26, 2020

(65) Prior Publication Data
US 2021/0316752 A1 Oct. 14, 2021

(30) Foreign Application Priority Data
Sep. 21, 2018 (DE) ...................... 10 2018 216 182.8

(51) Int. Cl.
*B60W 60/00* (2020.01)
*B60W 40/00* (2006.01)
(Continued)

(52) U.S. Cl.
CPC ........ *B60W 60/0011* (2020.02); *B60W 40/04* (2013.01); *B60W 40/105* (2013.01);
(Continued)

(58) Field of Classification Search
CPC ............. B60W 60/0011; B60W 40/04; B60W 40/105; B60W 50/00; B60W 60/0015;
(Continued)

(56) References Cited

U.S. PATENT DOCUMENTS

| 9,738,279 B2 | 8/2017 | Eichhorn et al. |
| 10,564,647 B2 | 2/2020 | Balaghiasefi et al. |

(Continued)

FOREIGN PATENT DOCUMENTS

| DE | 102010062012 A1 | 5/2012 | ............ B60W 30/10 |
| DE | 102013207658 A1 | 10/2014 | ............ B60W 30/08 |

(Continued)

OTHER PUBLICATIONS

German Office Action, Application No. 102018216182.8, 6 pages, dated Sep. 20, 2019.

(Continued)

*Primary Examiner* — Kira Nguyen
(74) *Attorney, Agent, or Firm* — Slayden Grubert Beard PLLC

(57) ABSTRACT

The present invention relates to a method for providing a route stipulation for a route system of a vehicle, comprising the following steps:
providing a plurality of detected trajectories of further vehicles in a route section to be used,
ascertaining a trajectory stipulation from the detected trajectories,
ascertaining a deviation zone from the detected trajectories, wherein the deviation zone is determined on the basis of a deviation of at least individual detected trajectories from the trajectory stipulation,
determining the route stipulation at least on the basis of the trajectory stipulation and the deviation zone.

18 Claims, 1 Drawing Sheet

(51) Int. Cl.
*B60W 40/04* (2006.01)
*B60W 40/105* (2012.01)
*B60W 50/00* (2006.01)
*G06V 20/58* (2022.01)

(52) U.S. Cl.
CPC ........ *B60W 50/00* (2013.01); *B60W 60/0015* (2020.02); *G06V 20/58* (2022.01); *B60W 2050/0051* (2013.01); *B60W 2556/50* (2020.02); *B60W 2556/65* (2020.02)

(58) Field of Classification Search
CPC ..... B60W 2050/0051; B60W 2556/50; B60W 2556/65
See application file for complete search history.

(56) References Cited

U.S. PATENT DOCUMENTS

| | | | | |
|---|---|---|---|---|
| 2004/0073361 | A1* | 4/2004 | Tzamaloukas | .......... H04W 8/04 |
| | | | | 701/414 |
| 2014/0200805 | A1* | 7/2014 | Modica | ................. G01C 21/34 |
| | | | | 701/466 |
| 2016/0200317 | A1* | 7/2016 | Danzl | ................... B60W 10/04 |
| | | | | 701/25 |
| 2019/0179324 | A1 | 6/2019 | Rottkamp et al. | |
| 2019/0196472 | A1* | 6/2019 | Körner | ................... G01C 21/32 |

FOREIGN PATENT DOCUMENTS

| | | | | |
|---|---|---|---|---|
| DE | 102015217891 A1 | 3/2017 | ............ | B60W 30/08 |
| DE | 102016209281 A1 | 11/2017 | ............ | B60W 30/08 |
| DE | 102016007567 A1 | 12/2017 | ............ | B60W 10/04 |
| DE | 102016216335 A1 | 3/2018 | ............ | B60W 40/06 |
| DE | 102018216182 A1 | 3/2020 | ............ | B60W 40/04 |
| EP | 3299921 A1 | 3/2018 | ............... | G05D 1/00 |
| WO | 2020/058463 A1 | 3/2020 | ............... | G08G 1/01 |

OTHER PUBLICATIONS

International Search Report and Written Opinion, Application No. PCT/EP2019/075294, 14 pages, dated Jan. 3, 2020.

German Office Action, Application No. 102018216182.8, 4 pages, dated Aug. 26, 2020.

\* cited by examiner

METHOD FOR PROVIDING A ROUTE STIPULATION

CROSS-REFERENCE TO RELATED APPLICATIONS

This application claims priority to German Patent Application No. 10 2018 216 182.8, filed on Sep. 21, 2018 with the German Patent and Trademark Office. The contents of the aforesaid Patent Application are incorporated herein for all purposes.

TECHNICAL FIELD

The present invention relates to a method for providing a route stipulation for a route system of a vehicle. The present invention also relates to a route system for a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Vehicles with driver assistance systems that support the driver in guiding the vehicle in the transverse and/or lateral direction are known from the prior art. Measurement values from comprehensive sensor systems, for example GPS, radar, ultrasound or cameras, serve as input data for the driver assistance systems. Thus, the position of the vehicle on the one hand and also that of other vehicles and objects as well as the delimitation of the roadway can be ascertained. This allows a vehicle to be guided based on current data.

In some instances, the driven trajectories of other traffic participants are used. These can serve as a trajectory stipulation in order to guide the vehicle on the basis of data from previous drives.

However, a disadvantage is that the trajectory stipulation based on this historical data is often only slightly significant for the vehicle guidance due to the current driving situation. Another disadvantage is that, if many driven trajectories are present, it is unclear how trajectories that differ from each other can be evaluated and used. Therefore, the use of such a trajectory stipulation is often limited, in particular for providing a safe and/or comfortable route.

SUMMARY

An object exists to overcome the disadvantages described in the preceding at least in part.

This object is solved by a method for providing a route stipulation for a route system of a vehicle as well as a route system for a vehicle according to the independent claims. Embodiments of the invention are discussed in the dependent claims and the following description.

The details of one or more embodiments are set forth in the accompanying drawings and the description below. Other features will be apparent from the description, drawings, and from the claims.

BRIEF DESCRIPTION OF THE DRAWINGS

Figure 1:
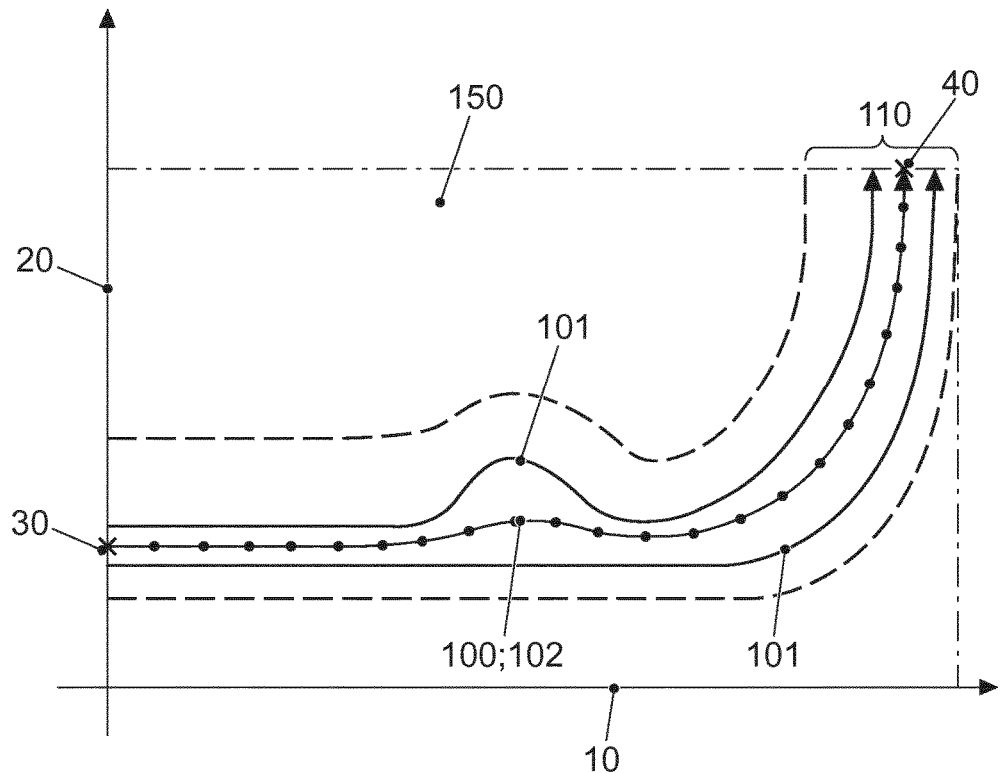
Figure 2:
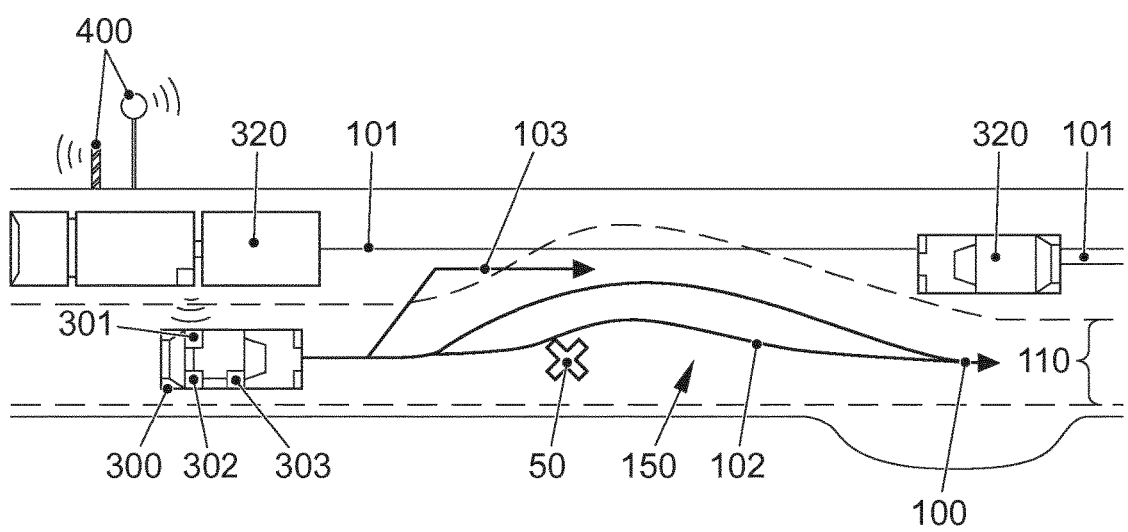

IN THE FIGS.:

FIG. 1 shows an exemplary representation of the route section to be used with various trajectories; and FIG. 2 shows an exemplary vehicle driving through a route section.

DESCRIPTION

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Features and details that are described in the following in association with the method also apply to the route system and vice versa, so that mutual reference is considered to be made with regard to the disclosure of the individual aspects discussed herein.

According to a first exemplary aspect, a method for providing a route stipulation for a vehicle is provided, in particular for a route system of the vehicle, comprising the following steps:

providing a plurality of detected trajectories of further vehicles in a route section to be used, for example by receiving by means of a receiving module of the vehicle, for example a database, or alternatively provided in a central processing device, wherein particularly the trajectories have been detected by the further vehicles, ascertaining/determining a trajectory stipulation from the detected trajectories, for example by a computing unit of the vehicle or by the central processing device, wherein optionally the trajectory stipulation is subsequently transmitted to the vehicle and/or is provided there, ascertaining/determining a deviation zone from the detected trajectories, for example by the computing unit of the vehicle or by the central processing device, wherein the deviation zone is determined on the basis of a deviation of at least individual detected trajectories from the trajectory stipulation, determining the route stipulation at least on the basis of the trajectory stipulation and deviation zone.

The aforementioned steps may be performed one after another in the specified sequence or in any other desired sequence. Individual and/or all steps may also be repeated as necessary.

By means of the route stipulation, the additional provision of the deviation zone may improve the trajectory stipulation. For example, on the basis of the deviation zone, a statement about the significance of the trajectory stipulation may be made in order to perform the vehicle guidance based on the route stipulation. In addition, the trajectory stipulation may also be used to employ the trajectory stipulation for the vehicle guidance, for example transverse guidance and/or longitudinal guidance of the vehicle, in the context of the deviation zone. A combination with the vehicle guidance on the basis of current data is thus possible, since the deviation zone can specify an area in which the current data can influence the vehicle guidance.

A route system of a vehicle may autonomously or at least partially autonomously determine the manner in which the vehicle moves in a route section to be used. The manner means in particular the transverse guidance, or steering, and/or the longitudinal guidance, i.e., controlling the speed of the vehicle. In this case, the route stipulation which is provided by the method according to the present aspect may correspond to the actually driven trajectories. However, it is also conceivable for there to be further route stipulations for the route system of a vehicle which are evaluated together and either one of the route stipulations is selected or a further route stipulation is calculated on the basis of multiple route stipulations.

A trajectory may be understood in a broader sense as the movement path of an object in a space. In a narrower sense, the trajectory can be the route of a vehicle in a route section, for example characterized by positions of the vehicle in the transverse direction and/or the longitudinal speed of the vehicle along a road. Detected trajectories may be, in other words, the movement paths which have already been traversed by vehicles and, for example, have been detected and/or saved and/or transmitted to a central processing device by these vehicles. The route section to be used is the space which is to be traversed by the vehicle for which the route stipulation is provided. The further vehicles are vehicles which have passed through a movement path in the route section to be used at a previous time. Here, it may also well be the vehicle for which the route stipulation according to the method according to the present aspect is provided. A trajectory stipulation may be a track or a movement path and/or a speed profile of the vehicle in the route section to be used. The deviation zone may be an area which is determined from the detected trajectories and which may surround the trajectory stipulation. The deviation zone may be one-dimensional, and thus comprises, for example, only an area in the transverse direction or an area that describes the deviation with regard to the average longitudinal speed. The route stipulation which is provided for a route system may be determined at least on the basis of the trajectory stipulation and the deviation zone, wherein in particular the deviation zone surrounds the trajectory stipulation and describes an area in which the vehicle may be located.

It may be provided in some embodiments that the vehicle, which may in principle be any type of vehicle, is a land vehicle, for example a motor vehicle and/or a passenger car.

In some embodiments, it may also be provided that the steps for providing a route stipulation are repeated. In this case, it may be provided that the route section to be used is further divided into subsections, and that the method for providing the route stipulation is performed at least at each point of the division. This offers the benefit that the computing effort for providing the route stipulation is reduced. Alternatively, it may also be provided in some embodiments that the method for providing a route stipulation runs continuously, which enables a particularly safe and exact route stipulation to be provided.

Furthermore, it may also be provided that the detected trajectories are transmitted through mobile data transmission and/or by vehicle-to-vehicle communication and/or between the vehicle and/or an infrastructure. Mobile data transmission offers the benefit that this is available at nearly every location and thus enables the detected trajectories to be provided particularly reliably. Vehicle-to-vehicle communication offers the benefit that particularly current detected trajectories can be transmitted in this way. Transmission via an infrastructure offers the benefit that detected trajectories can be reliably transmitted in particular at hazardous points or exceptional driving environments.

It may be provided in some embodiments that the detected trajectories are stored in a decentralized manner, for example in individual mobile devices, vehicles or an infrastructure, which offers the benefit of ensuring increased data security.

It may also be provided in some embodiments that the ascertainment of the trajectory stipulation and/or of the deviation zone and/or the determination of the route stipulation takes place on a server outside the vehicle. This offers the benefit that more complex calculations may also be performed, increasing the quality of the route stipulation and the safety.

Furthermore and in some embodiments, it may be provided that the ascertained trajectories are saved centrally on a server, which in particular offers the benefit that the data may be combined, optimized and saved in a particularly secure manner. In this case, it may also be provided in some embodiments that the data are anonymized so that it is not possible to identify individual people.

Moreover, it may also be provided in some embodiments that the trajectory stipulation is a mean trajectory of the detected trajectories, wherein for example an averaging using the arithmetic mean of the detected trajectories takes place and/or the deviation zone is calculated using the standard deviation of the detected trajectories. The averaging may in principle be any mathematical mean, for example the geometric or quadratic mean. It may also be provided in some embodiments that the median is used for averaging. The arithmetic mean offers the benefit that it can be calculated easily, and enables a uniform consideration of the data. With regard to the deviation zone, it may be provided in some embodiments that this is a fraction or a whole-number multiple of the calculated standard deviation. Furthermore, it may be provided in some embodiments that a distribution function of the detected trajectories is ascertained, and based on a mathematical analysis of the distribution function, a correspondingly adjusted variance is calculated. This offers the benefit that a particularly exact deviation zone can be ascertained. It may also be provided in some embodiments that the size of the deviation zone may be partially controlled through a user input, which offers the benefit that the driver of the vehicle may adjust the deviation zone to their individual needs, increasing the comfort when providing the route stipulation.

In the method according to the present exemplary aspect, it may also be provided in some embodiments that the following steps are performed:
  detecting sensor information about an environment of the vehicle in the route,
  ascertaining a sensor-based trajectory stipulation on the basis of the sensor information,
  adjusting the route stipulation on the basis of the sensor-based trajectory stipulation and the deviation zone, for example when the sensor information is specific to a situation in which an obstacle is located in the route section to be used of the vehicle.

The sensor information exemplary in this case be detected for example by a sensor system in the vehicle, wherein for example camera and/or radar and/or ultrasonic systems may be used. This offers the benefit that information on the immediate environment of the vehicle is present, which is typically of the highest relevance for the route stipulation. Alternatively or in addition, it may also be provided in some embodiments that sensor information about the environment of the vehicle is detected on sensor systems of other vehicles or infrastructure. This offers the benefit that such information that is relevant for the determination of the route stipulation but cannot be ascertained from the perspective of the vehicle by the sensors attached there is also accessible.

For example, in this case it may relate to the presence of objects in the route of the vehicle behind a curve. It may be provided in some embodiments that the route stipulation which has been determined on the basis of the trajectory stipulation and the deviation zone is changed using the sensor-based trajectory stipulation and the deviation zone to the effect that, when an obstacle is present, it is driven around such that the vehicle drives around the obstacle at least partially within the deviation zone. If it should result on the basis of the ascertained trajectories and the deviation zone that driving around the obstacle is not possible within the deviation zone, it may be provided that the route stipulation provides intervening in the longitudinal guidance of the vehicle and decelerating the vehicle or in particular bringing it to a standstill such that a collision is avoided.

In some embodiments, it may be provided that a weighting factor is taken into account when ascertaining the trajectory stipulation and/or the deviation zone, wherein the weighting factor takes into account the time between the ascertainment of the detected trajectories and a planned use of the route section by the vehicle and/or the type of the further vehicles of the detected trajectories.

In this case, it may also be provided in some embodiments that particularly current data are preferably dealt with, meaning the weighting factor is correspondingly high. This offers the benefit that hazardous situations or detours occurring on short notice may be for example taken into account when determining the route stipulation. Alternatively and in addition to this, it may also be provided that the type of the further vehicles is taken into account with the weighting factor. In this case, it can happen that certain vehicle characteristics such as, for example, the width or the turning radius should be taken into account. This offers the benefit that a particularly safe route stipulation may be created. It may be provided in some embodiments that the trajectory stipulation is calculated taking into account the weighting factor in that individual ascertained trajectories and/or the deviation zone are multiplied by a weighting factor. This offers the benefit that the weighting may be taken into account in a particularly simple manner.

Moreover, in the method according to the present exemplary aspect, it is conceivable that a distance in which the route stipulation is determined is dependent on a driving speed of the vehicle. In other words, it may be provided that the route stipulation is determined frequently or infrequently depending on whether the vehicle is traveling quickly or slowly. This offers the benefit that, in sections in which few changes are required, for example on the highway, unnecessary computing operations are avoided. If, however, a particularly exact ascertainment of the route stipulation is required, such as, for example, in narrow alleys or in a dynamic traffic flow, the distance in which the calculations are performed can be reduced so that a particularly reliable determination of the route stipulation is enabled.

It may also be provided in some embodiments that the route stipulation is used by an at least partially autonomous vehicle control to guide the vehicle in the transverse direction and/or longitudinal direction. In other words, the route stipulation may be used to accelerate, brake and steer the vehicle. This may occur both completely autonomously, unburdening the driver of the vehicle, or take place at least partially autonomously such that the driver is unburdened in particular in demanding driving situations, for example a traffic jam.

According to a second exemplary aspect, a route system for a vehicle is provided, having:

a receiving module for receiving detected trajectories in a route section to be used, a computing unit, to which the receiving module sends the detected trajectories, which is suitable for ascertaining a trajectory stipulation from the detected trajectories and a deviation zone on the basis of a deviation of at least individual detected trajectories from the trajectory stipulation, and for determining a route stipulation at least on the basis of the trajectory stipulation and the deviation zone.

The receiving module may be located in the vehicle, and for example hold, at least partially, already present receiving elements, such as, for example, antennas for radio reception. The computing unit may also be located on the vehicle and be at least partially composed of elements, such as, for example, processors, that are intended for an infotainment system. This offers the benefit that parts and thus weight for the route system or the vehicle may be saved.

It may be beneficial if, in the route system according to the present aspect, sensors which are suitable for detecting an environment around the vehicle are connected to the computing unit to send sensor information to the computing unit, wherein the computing unit is suitable for ascertaining a sensor-based trajectory stipulation from the sensor information in order to additionally determine a route stipulation on the basis of this sensor-based trajectory stipulation.

The sensors may for example comprise cameras, radar sensors, ultrasonic sensors and/or a GPS module. They are particularly suitable for detecting the position and the environment around the vehicle, wherein in particular objects in the vehicle environment may be ascertained. It may also be provided that sensors of other vehicles or infrastructure are used to obtain sensor information about areas that are not accessible to the sensors located on the vehicle. This offers the benefit that a particularly safe route stipulation is enabled.

Furthermore, it may be provided that the route system is suitable for executing a method for providing a route stipulation according to the first exemplary aspect or one or more of its embodiments.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a coordinate system with a first axis 10 and a second axis 20, in which a route section 150 to be used is marked as a sub-area of the coordinate system 10, 20. FIG. 1 also shows a first route point 30 and a second route point 40, between which multiple trajectories 101, 102 as well as a route stipulation 100 extend. According to the present embodiment, it is provided that a plurality of detected trajectories 101 of further vehicles 320 in the route section 150 to be used are provided. These detected trajectories 101 are shown on the basis of two examples in FIG. 1. In a further step, from these detected trajectories 101, a trajectory stipulation 102 is ascertained which, in FIG. 1, lies between the detected trajectories 101. In addition, a deviation zone is determined from the detected trajectories 101 on the basis of the deviation of at least individual detected trajectories 101 from the trajectory stipulation 102. As shown in FIG. 1, it can thus be provided that the deviation zone 110 surrounds the trajectory stipulation 102, and thus forms an area within the route section 150 to be used in which the vehicle 300 can for example be located when it is to be moved from a first route point 30 to a second route point 40.

It may be provided that the trajectory stipulation 102 is a mean trajectory of the detected trajectories 101, wherein for example an averaging of the detected trajectories 101 takes place and/or the deviation zone is calculated using the standard deviation of the detected trajectories 101. This is illustrated in FIG. 1 to the extent that, in the upper of the two detected trajectories 101, a type of evasive movement can be recognized, as a result of which both the trajectory stipulation 102 and the deviation zone 110 is adjusted compared to the further detected trajectory 101, which does not comprise an evasive movement.

FIG. 2 schematically shows a driving situation in a route section 150 to be used in which a vehicle 300 is diverted around an obstacle 50 on the basis of a route stipulation 100 or with a route system. In addition, further vehicles 320 are shown which provide detected trajectories 101. In this case, the detected trajectories 101 can be transmitted on the one hand through mobile data transmission and/or by vehicle-to-vehicle communication and/or between the vehicle 300 and/or an infrastructure 400. The infrastructure can be, for example, barriers, street signs, traffic light systems or other objects located in the vicinity of the road. The route system for a vehicle can have a receiving module 301 for receiving detected trajectories 101 in a route section 150 to be used as well as a computing unit 302, to which the receiving module 301 sends the detected trajectories. In this case, the computing unit 302 is suitable for ascertaining a trajectory stipulation 102 from the detected trajectories 101 and a deviation zone 110 on the basis of a deviation of at least individual detected trajectories 101 from the trajectory stipulation 102. On the basis of the trajectory stipulation 102 and the deviation zone 110, the computing unit 302 then determines a route stipulation 100.

The route system can also comprise sensors 303 which are suitable for detecting an environment in the vehicle 300, wherein the sensors are connected to the computing unit 302 to send sensor information to the computing unit 302. The computing unit 302 can in turn be suitable for ascertaining a sensor-based trajectory stipulation 103 from the sensor information, as shown in FIG. 2. Here, the sensors 303 detect the obstacle 50, which is located on the trajectory stipulation 102. FIG. 2 also shows that, due to the fact that the sensor information is specific to a situation in which an obstacle 50 is located in the route section 150 to be used of the vehicle 300, the route stipulation 100 is adjusted such that the obstacle 50 is driven around and at the same time the deviation zone 110 is not departed from. It is also demonstrated in FIG. 2 that a pull-off area in the road, as can be seen in the right part of FIG. 2, is disregarded in the route stipulation 100. If, for example, the sensors 303 are only suitable for ascertaining a sensor-based trajectory stipulation 103, only on the basis of a road edge, the method according to the present embodiment can prevent the vehicle 300 from leaving the deviation zone 110 and thus avoid an unnecessary adjustment of the route. If the sensors 303 discern that a collision with a further vehicle 320 or a further object 50 is a threat when driving around the obstacle 50 within the deviation zone, the adjustment of the route stipulation 100 can also naturally comprise that the vehicle 300 is braked or even brought to a standstill.

LIST OF REFERENCE NUMERALS

10 First axis
20 Second axis
30 First route point
40 Second route point
50 Obstacle
100 Route stipulation
101 Detected trajectories
102 Trajectory stipulation
103 Sensor-based trajectory stipulation
110 Deviation zone
150 Route section to be used
300 Vehicle
301 Receiving module
302 Computing unit
303 Sensors
320 Further vehicles
400 Infrastructure The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for providing a route stipulation for an at least partially autonomous vehicle, comprising:
   receiving, using a wireless receiver, a plurality of detected trajectories of further vehicles in a route section to be used;
   automatically processing the detected trajectories and determining a trajectory stipulation from the detected trajectories;
   automatically determining a deviation zone from the detected trajectories on the basis of a deviation of at least one of the detected trajectories from the trajectory stipulation;
   automatically determining the route stipulation using the determined trajectory stipulation and the determined deviation zone; and
   controlling, in an at least partially autonomous driving mode, the vehicle according to the determined route stipulation; wherein
   a distance in which the route stipulation is determined is dependent on a driving speed of the vehicle.

2. The method of claim 1, wherein the detected trajectories are transmitted through mobile data transmission and/or by vehicle-to-vehicle communication and/or between the vehicle and/or an infrastructure.

3. The method of claim 2, wherein the trajectory stipulation is a mean trajectory of the detected trajectories.

4. The method of claim 3, further comprising one or more of averaging using the arithmetic mean of the detected trajectories and calculating the deviation zone using the standard deviation of the detected trajectories.

5. The method of claim 2, wherein the following steps are also performed:
   detecting sensor information about an environment of the vehicle on the route;
   determining a sensor-based trajectory stipulation on the basis of the sensor information;
   adjusting the route stipulation on the basis of the sensor-based trajectory stipulation and the deviation zone.

6. The method of claim 2, wherein a weighting factor is taken into account when ascertaining the trajectory stipulation and/or the deviation zone, wherein the time between the ascertainment of the detected trajectories and a planned use of the route section by the vehicle and/or the type of the further vehicles of the detected trajectories is taken into account in the weighting factor.

7. The method of claim 1, wherein the trajectory stipulation is a mean trajectory of the detected trajectories.

8. The method of claim 7, further comprising one or more of averaging using the arithmetic mean of the detected trajectories and calculating the deviation zone using the standard deviation of the detected trajectories.

9. The method of claim 7, wherein the following steps are also performed:
   detecting sensor information about an environment of the vehicle on the route;
   determining a sensor-based trajectory stipulation on the basis of the sensor information;
   adjusting the route stipulation on the basis of the sensor-based trajectory stipulation and the deviation zone.

10. The method of claim 7, wherein a weighting factor is taken into account when ascertaining the trajectory stipulation and/or the deviation zone, wherein the time between the ascertainment of the detected trajectories and a planned use of the route section by the vehicle and/or the type of the further vehicles of the detected trajectories is taken into account in the weighting factor.

11. The method of claim 1, wherein the following steps are also performed:
   detecting sensor information about an environment of the vehicle on the route;
   determining a sensor-based trajectory stipulation on the basis of the sensor information;
   adjusting the route stipulation on the basis of the sensor-based trajectory stipulation and the deviation zone.

12. The method of claim 11, wherein the sensor information is specific to a situation in which an obstacle is located in the route section to be used of the vehicle.

13. The method of claim 11, wherein a weighting factor is taken into account when ascertaining the trajectory stipulation and/or the deviation zone, wherein the time between the ascertainment of the detected trajectories and a planned use of the route section by the vehicle and/or the type of the further vehicles of the detected trajectories is taken into account in the weighting factor.

14. The method of claim 1, wherein a weighting factor is taken into account when ascertaining the trajectory stipulation and/or the deviation zone, wherein the time between the ascertainment of the detected trajectories and a planned use of the route section by the vehicle and/or the type of the further vehicles of the detected trajectories is taken into account in the weighting factor.

15. The method of claim 1, wherein the route stipulation is used by the at least partially autonomous vehicle control to guide the vehicle in the transverse direction and/or longitudinal direction.

16. A route system for an at least partially autonomous vehicle, having:
   a wireless receiver for receiving detected trajectories of further vehicles in a route section to be used;
   a processing circuit, connected with the wireless receiver to obtain the detected trajectories, which processing circuit is configured to:
   automatically process the detected trajectory and determine a trajectory stipulation from the detected trajectories;
   automatically determine a deviation zone on the basis of a deviation of at least one of the detected trajectories from the trajectory stipulation;
   automatically determine a route stipulation at least on the basis of the trajectory stipulation and the deviation zone; and
   control, in an at least partially autonomous driving mode, the vehicle according to the determined route stipulation; wherein
   a distance in which the route stipulation is determined is dependent on a driving speed of the vehicle.

17. The route system of claim 16, comprising sensors which are configured for detecting an environment around the vehicle, and which are connected to the processing circuit to send sensor information to the processing circuit, wherein the processing circuit is configured to ascertain a sensor-based trajectory stipulation from the sensor information to additionally determine a route stipulation on the basis of this sensor-based trajectory stipulation.

18. The route system of claim 16, wherein the route system is suitable for executing the method for providing a route stipulation of claim 1.

* * * * *